US012580654B2

(12) United States Patent
Nakamura et al.

(10) Patent No.: US 12,580,654 B2
(45) Date of Patent: Mar. 17, 2026

(54) OPTICAL TRANSMISSION SYSTEM, OPTICAL RECEIVER, OPTICAL TRANSMITTER, CONTROL METHOD AND PROGRAM

(71) Applicant: NTT, Inc., Tokyo (JP)

(72) Inventors: Masanori Nakamura, Musashino (JP); Takeo Sasai, Musashino (JP); Etsushi Yamazaki, Musashino (JP); Takayuki Kobayashi, Musashino (JP); Fukutaro Hamaoka, Musashino (JP); Yoshiaki Kisaka, Musashino (JP)

(73) Assignee: NTT, Inc., Tokyo (JP)

( * ) Notice: Subject to any disclaimer, the term of this patent is extended or adjusted under 35 U.S.C. 154(b) by 316 days.

(21) Appl. No.: 18/037,526

(22) PCT Filed: Nov. 27, 2020

(86) PCT No.: PCT/JP2020/044223
§ 371 (c)(1),
(2) Date: May 17, 2023

(87) PCT Pub. No.: WO2022/113268
PCT Pub. Date: Jun. 2, 2022

(65) Prior Publication Data
US 2025/0226884 A1 Jul. 10, 2025

(51) Int. Cl.
H04B 10/2543 (2013.01)
H04B 10/2525 (2013.01)
H04B 10/58 (2013.01)
H04B 10/61 (2013.01)

(52) U.S. Cl.
CPC ..... H04B 10/2543 (2013.01); H04B 10/2525 (2013.01); H04B 10/58 (2013.01); H04B 10/6163 (2013.01)

(58) Field of Classification Search
None
See application file for complete search history.

(56) References Cited

U.S. PATENT DOCUMENTS 7,558,479 B1 * 7/2009 Robinson ........... H04B 10/2543
                                              398/16
2001/0022676 A1 * 9/2001 Ishikawa ............ G02B 6/29377
                                              398/82

(Continued)

OTHER PUBLICATIONS

Ezra Ip, Nonlinear Compensation Using Backpropagation for Polarization-Multiplexed Transmission, Journal of Lightwave Technology, vol. 28, No. 6, Mar. 15, 2010.

*Primary Examiner* — Darren E Wolf

(57) ABSTRACT
According to an aspect of the present invention, there is provided an optical receiver in an optical transmission system that transmits an optical signal between an optical transmitter and an optical receiver connected via an optical fiber transmission path, the optical receiver including: a channel distribution estimation unit that estimates channel distribution information in a transmission direction based on the optical signal transmitted from the optical transmitter and a reference signal; and a non-linear compensation unit that performs non-linear compensation based on the channel distribution information estimated by the channel distribution estimation unit.

8 Claims, 9 Drawing Sheets

(56)            References Cited

U.S. PATENT DOCUMENTS

2004/0213578 A1 * 10/2004 Takahara ........... H04B 10/2513
                                                       398/147
2009/0238578 A1 * 9/2009 Taylor ................ H04B 10/6972
                                                       398/147
2010/0196017 A1 * 8/2010 Tanimura ........... H04B 10/6161
                                                       398/208

* cited by examiner

FIG. 5

OPTICAL TRANSMISSION SYSTEM, OPTICAL RECEIVER, OPTICAL TRANSMITTER, CONTROL METHOD AND PROGRAM

CROSS-REFERENCE TO RELATED APPLICATIONS

This application is a 371 U.S. National Phase of International Application No. PCT/JP2020/044223, filed on Nov. 27, 2020. The entire disclosure of the above application is incorporated herein by reference.

TECHNICAL FIELD

The present invention relates to a technology of an optical transmission system, an optical receiver, an optical transmitter, a control method and a program.

BACKGROUND ART

With an increase in demand for data communication, a technology for transmitting a long-range optical signal with a large capacity has been studied. In transmission using an optical fiber, it is necessary to compensate for waveform distortion of an optical signal caused by a non-linear optical effect generated in an optical fiber transmission path. Conventionally, digital backpropagation (DBP) that compensates for a non-linear optical phenomenon in an optical fiber using digital signal processing is known as a technology for extending a transmission distance in optical fiber transmission (refer to Non Patent Literature 1).

CITATION LIST

Non Patent Literature

Non Patent Literature 1: Ezra Ip, JOURNAL OF LIGHTWAVE TECHNOLOGY, VOL. 28, NO. 6, p. 939, (2010)

SUMMARY OF INVENTION

Technical Problem

In the DBP described above, since information in a transmission direction (longitudinal direction) in an optical fiber is not considered, there is a problem that sufficient compensation cannot be performed and it is difficult to realize high-performance optical communication.

In view of the above circumstances, an object of the present invention is to provide a technology capable of realizing higher-performance optical communication.

Solution to Problem

According to an aspect of the present invention, there is provided an optical receiver in an optical transmission system that transmits an optical signal between an optical transmitter and an optical receiver connected via an optical fiber transmission path, the optical receiver including: a channel distribution estimation unit (hereinafter also referred to as "channel distribution estimator") that estimates channel distribution information in a transmission direction based on the optical signal transmitted from the optical transmitter and a reference signal; and a non-linear compensation unit (hereinafter also referred to as "nonlinear compensator") that performs non-linear compensation based on the channel distribution information estimated by the channel distribution estimation unit.

According to another aspect of the present invention, there is provided an optical receiver including a non-linear compensation unit that performs non-linear compensation based on channel distribution information in a transmission direction estimated based on an optical signal transmitted from an optical transmitter connected via an optical fiber transmission path and a reference signal.

According to still another aspect of the present invention, there is provided an optical transmission system that transmits an optical signal between an optical transmitter and an optical receiver connected via an optical fiber transmission path, in which the optical receiver includes a channel distribution estimation unit that estimates channel distribution information in a transmission direction for performing non-linear compensation based on the optical signal transmitted from the optical transmitter and a reference signal, and the optical transmitter includes a non-linear pre-equalization unit (hereinafter also referred to as "non-linear pre-equalizer") that adds in advance inverse characteristics of wavelength dispersion, polarization mode dispersion, and an optical non-linear effect, which are generated in the optical fiber transmission path, to an optical signal transmitted to the optical receiver based on the channel distribution information estimated by the channel distribution estimation unit.

According to still another aspect of the present invention, there is provided an optical transmitter including a non-linear pre-equalization unit that adds in advance inverse characteristics of wavelength dispersion, polarization mode dispersion, and an optical non-linear effect, which are generated in an optical fiber transmission path, to an optical signal transmitted to the optical receiver based on channel distribution information in a transmission direction, the channel distribution information being estimated based on an optical signal transmitted to the optical transmitter connected via the optical fiber transmission path and a reference signal.

According to still another aspect of the present invention, there is provided a control method of an optical receiver in an optical transmission system that transmits an optical signal between an optical transmitter and the optical receiver connected via an optical fiber transmission path, the control method including: a channel distribution estimation step in which a channel distribution estimation unit estimates channel distribution information in a transmission direction based on the optical signal transmitted from the optical transmitter and a reference signal; and a non-linear compensation step in which a non-linear compensation unit performs non-linear compensation based on the channel distribution information estimated in the channel distribution estimation step.

According to still another aspect of the present invention, there is provided a program for causing an optical receiver to function as a computer in an optical transmission system that transmits an optical signal between an optical transmitter and the optical receiver connected via an optical fiber transmission path, in which the computer is caused to function as a channel distribution estimation unit that estimates channel distribution information in a transmission direction based on the optical signal transmitted from the optical transmitter and a reference signal, and a non-linear compensation unit that performs non-linear compensation based on the channel distribution information estimated by the channel distribution estimation unit.

Advantageous Effects of Invention

According to the present invention, it is possible to realize higher-performance optical communication.

BRIEF DESCRIPTION OF DRAWINGS

FIG. 5 is a block diagram illustrating a configuration example of channel distribution estimation units 26 and 226.

FIG. 7 is a block diagram illustrating a configuration of a non-linear compensation unit and the like.

DESCRIPTION OF EMBODIMENTS

Embodiments of the present invention will be described in detail with reference to the drawings. Each optical transmission system described below is a system that transmits and receives light using a coherent technology.

Configuration Example 1

Figure 1:
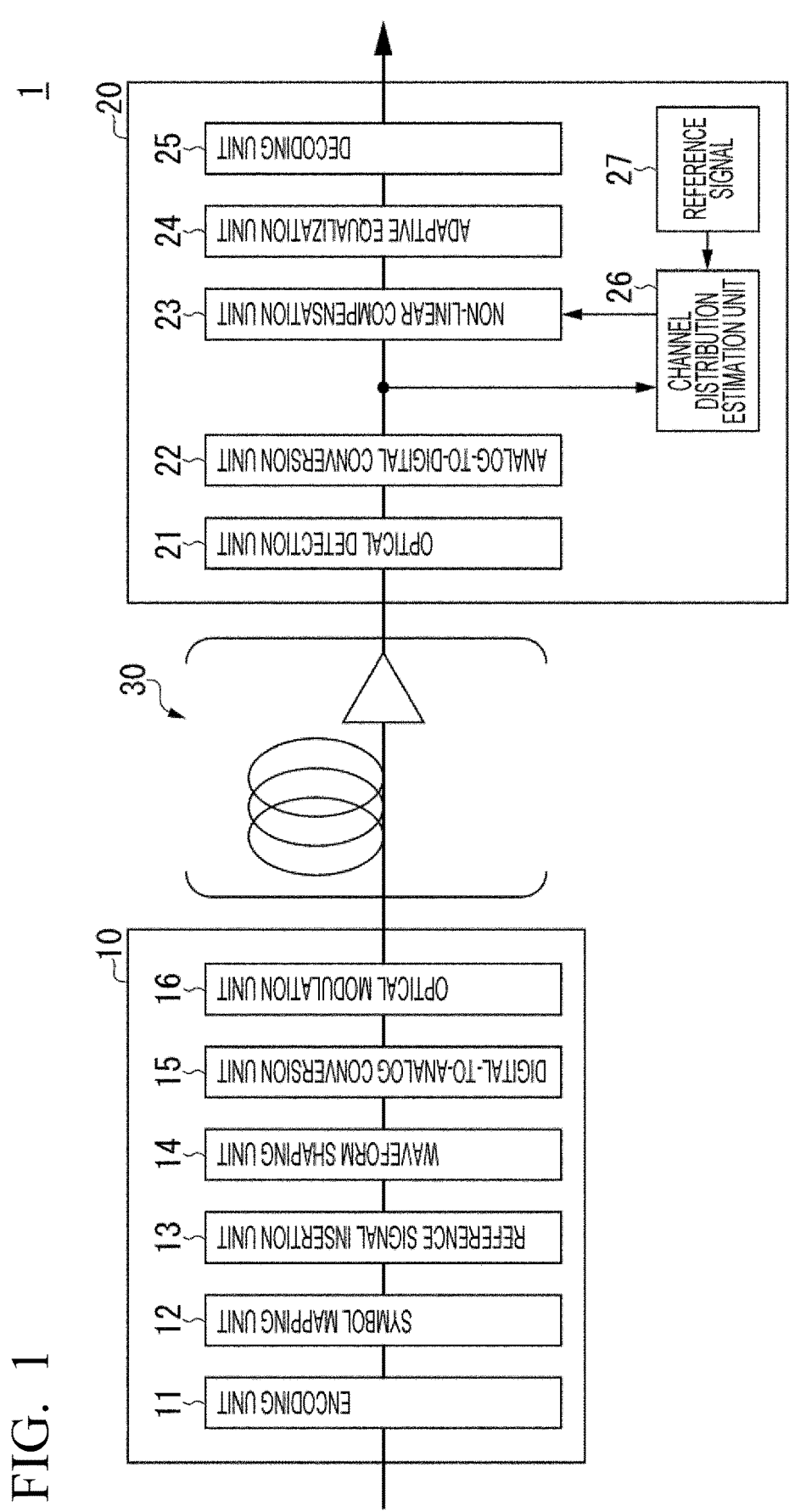
FIG. 1 is a block diagram illustrating a configuration of an optical transmission system 1 in Configuration Example 1.

FIG. 1 is a block diagram illustrating a configuration of an optical transmission system 1 in Configuration Example 1 according to an embodiment. The optical transmission system 1 includes an optical transmitter 10, an optical receiver 20, and an optical transmission path 30. The optical transmitter 10 and the optical receiver 20 are communicatively connected via the optical transmission path 30. The optical transmission path 30 includes an optical fiber, an optical amplifier, or the like, and transmits an optical signal transmitted by the optical transmitter 10 to the optical receiver 20.

The optical transmitter 10 includes an encoding unit 11, a symbol mapping unit 12, a reference signal insertion unit 13, a waveform shaping unit 14, a digital-to-analog conversion unit 15, and an optical modulation unit 16.

The encoding unit 11 encodes the input bit sequence using an arbitrary error correction code, and outputs the encoded bit sequence to the symbol mapping unit 12. The symbol mapping unit 12 maps the input bit sequence into a predetermined symbol such as quaternary phase-shift keying (QPSK) or quadrature amplitude modulation (QAM), and outputs the symbol to the reference signal insertion unit 13. The reference signal insertion unit 13 inserts the reference signal and outputs the reference signal to the waveform shaping unit 14.

The waveform shaping unit 14 performs Nyquist filtering or the like on the input symbol sequence, and outputs the symbol sequence to the digital-to-analog conversion unit 15. At this time, the waveform shaping unit 14 may pre-equalize inverse characteristics of a transfer function of an analog device used in the optical transmitter 10 or an optical transmission path. The digital-to-analog conversion unit 15 converts the input digital signal into an analog signal and outputs the analog signal to the optical modulation unit 16. The optical modulation unit 16 converts the input electrical signal into an optical signal and outputs the optical signal to the optical transmission path 30.

The optical receiver 20 includes an optical detection unit 21, an analog-to-digital conversion unit 22, a non-linear compensation unit 23, an adaptive equalization unit 24, a decoding unit 25, and a channel distribution estimation unit 26.

The optical detection unit 21 converts the signal modulated at the carrier frequency into a baseband analog electrical signal by coherent detection or square-law detection that causes interference between the received optical signal and the local light, and outputs the baseband analog electrical signal to the analog-to-digital conversion unit 22. The analog-to-digital conversion unit 22 converts the analog signal into a digital signal and outputs the digital signal to the non-linear compensation unit 23 and the channel distribution estimation unit 26. The channel distribution estimation unit 26 estimates channel distribution information (intensity distribution, polarization state, wavelength dispersion, and the like) in the transmission direction (longitudinal direction) in the optical fiber using the reference signal 27, and outputs the channel distribution information to the non-linear compensation unit 23.

The non-linear compensation unit 23 performs non-linear compensation based on the channel distribution information to output to the adaptive equalization unit 24. Specifically, by repeatedly executing processing by the non-linear phase rotation compensation unit according to the intensity of the signal waveform and the linear compensation unit using an FIR filter or the frequency domain equalization, the non-linear compensation unit 23 equalizes the wavelength dispersion, the polarization mode dispersion, and the optical non-linear effect, which are generated in the transmission path. At this time, the linear compensation unit may also perform waveform shaping such as compensation of a transfer function of an analog device of the optical receiver 20 at the same time. Detailed configurations of the non-linear Compensation unit 23 and the channel distribution estimation unit 26 will be described later.

The adaptive equalization unit 24 dynamically estimates and compensates for a dynamically varying polarization state, laser frequency offset/phase noise, a clock phase, and the like generated in the optical transmission path by digital signal processing such as an FIR filter and frequency domain equalization, to output to the decoding unit 25. Furthermore, the adaptive equalization unit 24 operates a matching filter corresponding to noise added by the optical transmitter 10, the optical transmission path 30, and the optical receiver 20. The decoding unit 25 performs error correction based on the input symbol sequence or likelihood sequence, (Configuration Example 2)

Figure 2:
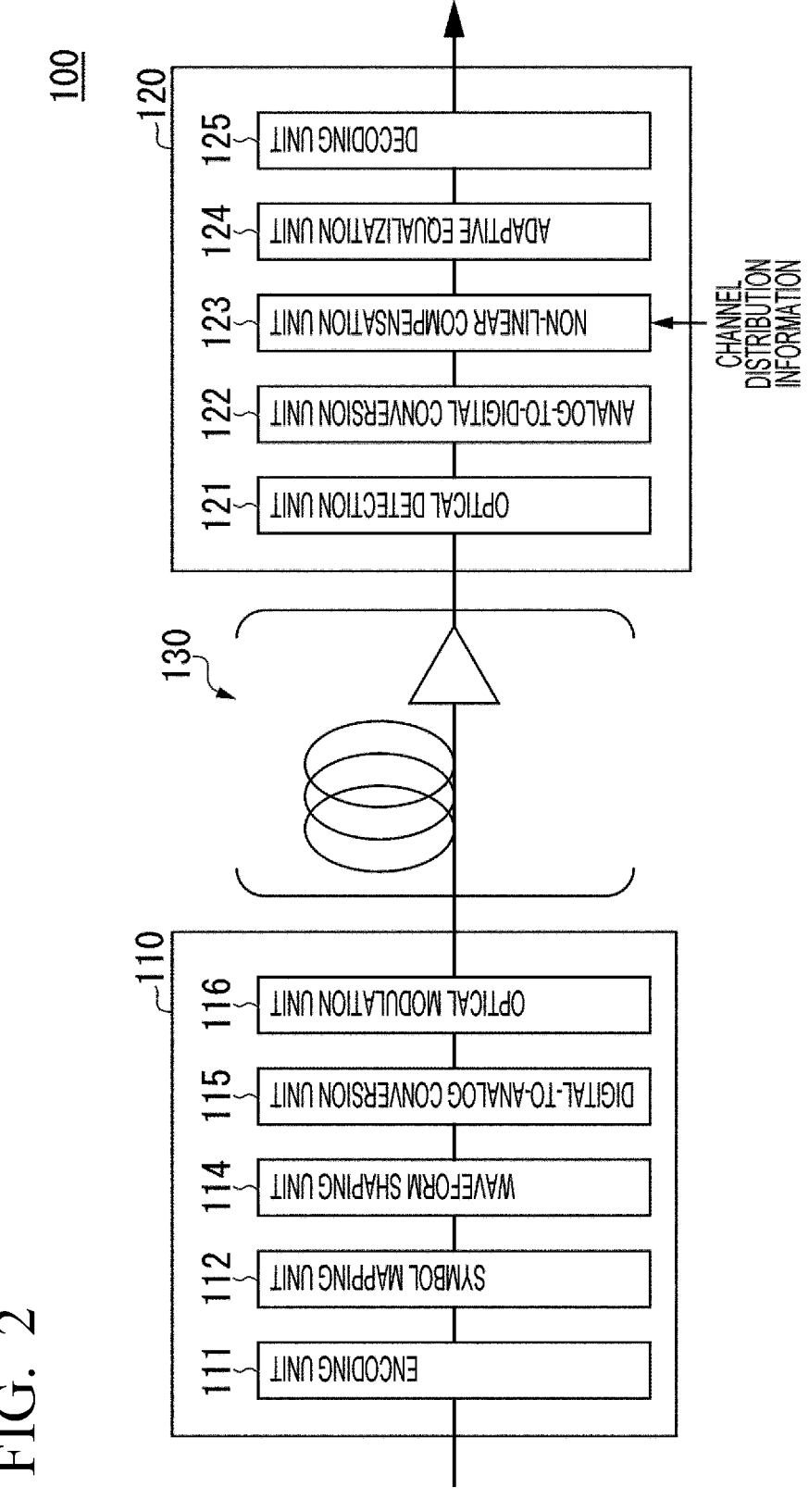
FIG. 2 is a block diagram illustrating a configuration of an optical transmission system 100 in Configuration Example 2.

FIG. 2 is a block diagram illustrating a configuration of an optical transmission system 100 in Configuration Example 2 according to the embodiment. The optical transmission system 100 includes an optical transmitter 110, an optical receiver 120, and an optical transmission path 130. The optical transmitter 110 and the optical receiver 120 are communicatively connected via the optical transmission path 130. The optical transmission path 130 includes an optical fiber, an optical amplifier, or the like, and transmits an optical signal transmitted by the optical transmitter 110 to the optical receiver 120.

The optical transmitter 110 includes an encoding unit 111, a symbol mapping unit 112, a waveform shaping unit 114, a digital-to-analog conversion unit 115, and an optical modulation unit 116. Configuration Example 2 has a configuration in which the reference signal insertion unit 13 is removed from Configuration Example 1.

The encoding unit 111 encodes the input bit sequence using an arbitrary error correction code, and outputs the encoded bit sequence to the symbol mapping unit 112. The symbol mapping unit 112 maps the input bit sequence into a predetermined symbol such as QPSK or QAM, and outputs the symbol to the waveform shaping unit 114.

The waveform shaping unit 114 performs Nyquist filtering or the like on the input symbol sequence, and outputs the symbol sequence to the digital-to-analog conversion unit 115. At this time, the waveform shaping unit 114 may pre-equalize inverse characteristics of a transfer function of an analog device used in the optical transmitter 110 or an optical transmission path. The digital-to-analog conversion unit 115 converts the input digital signal into an analog signal and outputs the analog signal to the optical modulation unit 116. The optical modulation unit 116 converts the input electrical signal into an optical signal and outputs the optical signal to the optical transmission path 130.

The optical receiver 120 includes an optical detection unit 121, an analog-to-digital conversion unit 122, a non-linear compensation unit 123, an adaptive equalization unit 124, and a decoding unit 125. Configuration Example 2 is obtained by removing the channel distribution estimation unit 26 from Configuration Example 1, The optical detection unit 121 converts the signal modulated at the carrier frequency into a baseband analog electrical signal by coherent detection or square-law detection that causes interference between the received optical signal and the local light, and outputs the baseband analog electrical signal to the analog-to-digital conversion unit 122. The analog-to-digital conversion unit 122 converts the analog signal into a digital signal and outputs the digital signal to the non-linear compensation unit 123.

The non-linear compensation unit 123 receives channel distribution information from another device in addition to the output from the analog-to-digital conversion unit 122. The non-linear compensation unit 123 performs non-linear compensation based on the channel distribution information to output to the adaptive equalization unit 124. Specifically, by repeatedly executing processing by the linear compensation unit using an FIR filter or the frequency domain equalization and the non-linear phase rotation compensation unit according to the intensity of the signal waveform, the non-linear compensation unit 23 equalizes the wavelength dispersion, the polarization mode dispersion, and the optical non-linear effect generated in the transmission path. At this time, the linear compensation unit may also perform waveform shaping such as compensation of a transfer function of an analog device of the optical receiver 120 at the same time.

Detailed configurations of the non-linear compensation unit 123 will be described later. As the channel distribution information, a channel distribution measurement value and a design value (such as a predetermined parameter for performing non-linear compensation) may be input. In this case, the non-linear compensation unit 123 performs non-linear compensation based on the channel distribution measurement value and the design value to output to the adaptive equalization unit 124.

The adaptive equalization unit 124 dynamically estimates and compensates for a dynamically varying polarization state, laser frequency offset/phase noise, a clock phase, and the like generated in the optical transmission path by digital signal processing such as an FIR filter and frequency domain equalization, to output to the decoding unit 125. Furthermore, the adaptive equalization unit 24 operates a matching filter corresponding to noise added by the optical transmitter 110, the optical transmission path 130, and the optical receiver 120. The decoding unit 125 performs error correction based on the input symbol sequence or likelihood sequence.

Configuration Example 3

Figure 3:
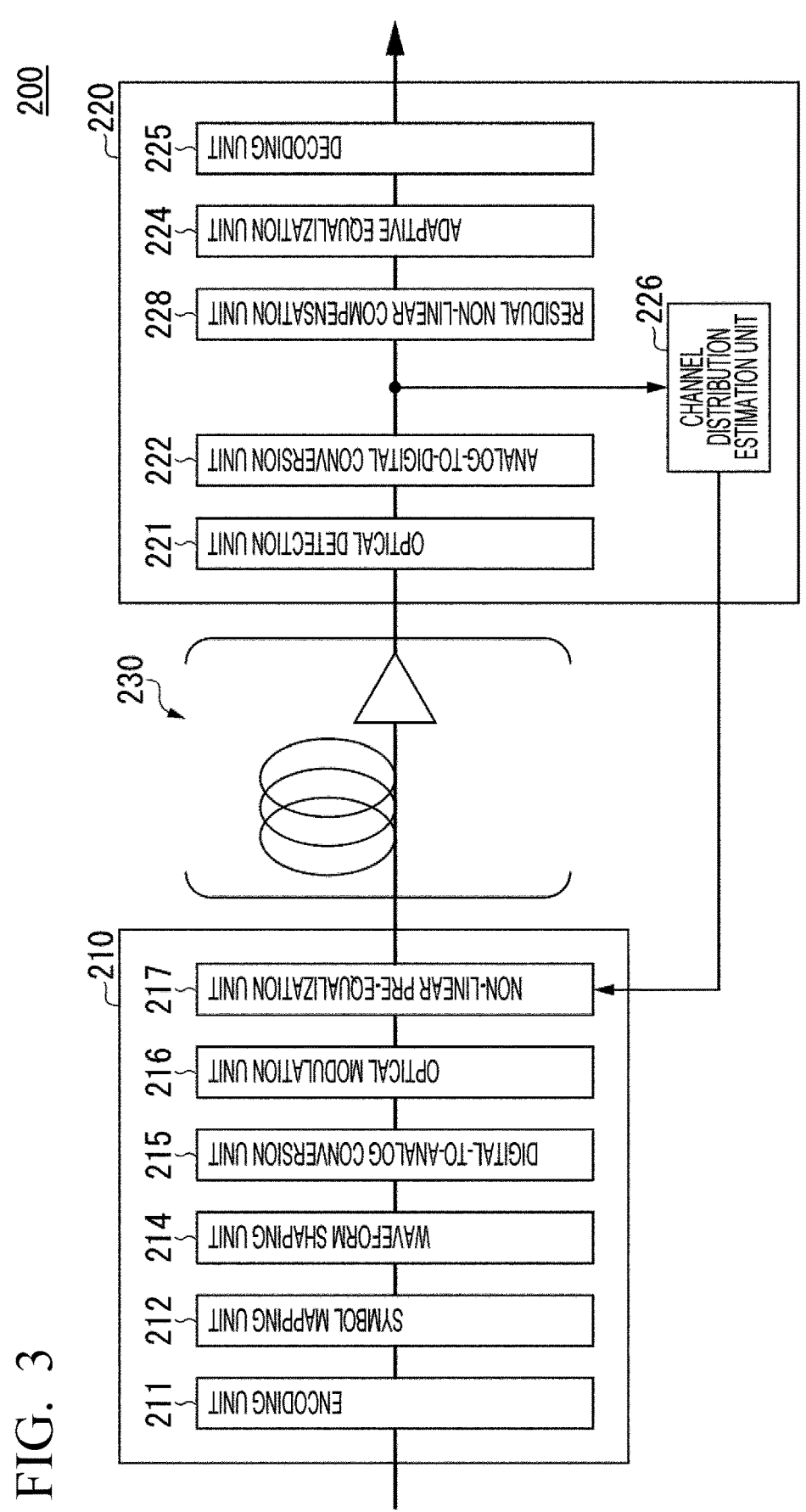
FIG. 3 is a block diagram illustrating a configuration of an optical transmission system 200 in Configuration Example 3.

FIG. 3 is a block diagram illustrating a configuration of an optical transmission system 200 in Configuration Example 3 according to the embodiment. The optical transmission system 200 includes an optical transmitter 210, an optical receiver 220, and an optical transmission path 230. The optical transmitter 210 and the optical receiver 220 are communicatively connected via the optical transmission path 230. The optical transmission path 230 includes an optical fiber, an optical amplifier, or the like, and transmits an optical signal transmitted by the optical transmitter 210 to the optical receiver 220.

The optical transmitter 210 includes an encoding unit 211, a symbol mapping unit 212, a waveform shaping unit 214, a digital-to-analog conversion unit 215, an optical modulation unit 216, and a non-linear pre-equalization unit 217. Configuration Example 3 has a configuration in which the reference signal insertion unit 13 is removed from Configuration Example 1 and the non-linear pre-equalization unit 217 is added.

The encoding unit 211 encodes the input bit sequence using an any error correction code, and outputs the encoded bit sequence to the symbol mapping unit 212. The symbol mapping unit 212 maps the input bit sequence into a predetermined symbol such as QPSK or QAM, and outputs the symbol to the waveform shaping unit 214.

The waveform shaping unit 214 performs Nyquist filtering or the like on the input symbol sequence, and outputs the symbol sequence to the digital-to-analog conversion unit 215. At this time, the waveform shaping unit 214 may pre-equalize inverse characteristics of a transfer function of an analog device used in the optical transmitter 210 or an optical transmission path. The digital-to-analog conversion unit 215 converts the input digital signal into an analog signal and outputs the analog signal to the optical modulation unit 216. The optical modulation unit 216 converts the input electrical signal into an optical signal and outputs the optical signal to the non-linear pre-equalization unit 217.

The non-linear pre-equalization unit 217 is connected to the channel distribution estimation unit 226 described later through a control channel or a communication channel, and channel distribution information is input from the channel distribution estimation unit 226.

The non-linear pre-equalization unit 217 adds in advance the inverse characteristics of the wavelength dispersion, the polarization mode dispersion, and the optical non-linear effect, which are generated in the transmission path, based on the channel distribution information, and outputs these to the optical transmission path 230.

The optical receiver 220 includes an optical detection unit 221, an analog-to-digital conversion unit 222, a channel distribution estimation unit 226, a residual non-linear compensation unit 228, an adaptive equalization unit 224, and a decoding unit 225. Configuration Example 3 has a configuration in which the non-linear compensation unit 23 is removed from Configuration Example 1 and the residual non-linear compensation unit 228 is added.

The optical detection unit 221 converts the signal modulated at the carrier frequency into a baseband analog electrical signal by coherent detection or square-law detection that causes interference between the received optical signal and the local light, and outputs the baseband analog electrical signal to the analog-to-digital conversion unit 222. The analog-to-digital conversion unit 222 converts the analog signal into a digital signal and outputs the digital signal to the channel distribution estimation unit 226 and the residual non-linear compensation unit 228.

The channel distribution estimation unit 226 estimates channel distribution information (intensity distribution, polarization state, wavelength dispersion, and the like) in the transmission direction in the optical fiber, and outputs the channel distribution information to the non-linear pre-equalization unit 217.

By repeatedly executing the processing by the linear compensation unit using the FIR filter or frequency domain equalization and the non-linear phase rotation compensation unit according to the intensity of the signal waveform, the residual non-linear compensation unit 228 equalizes the wavelength dispersion, the polarization mode dispersion, and the optical non-linear effect, which cannot be compensated by the non-linear pre-equalization unit 217, to output to the adaptive equalization unit 224. At this time, waveform shaping such as compensation of a transfer function of an analog device of the optical receiver 220 may be performed at the same time in the residual linear compensation unit 228.

The adaptive equalization unit 224 dynamically estimates and compensates for a dynamically varying polarization state, laser frequency offset/phase noise, a clock phase, and the like generated in the optical transmission path by digital signal processing such as an FIR filter and frequency domain equalization, to output to the decoding unit 225. Furthermore, the adaptive equalization unit 24 operates a matching filter corresponding to noise added in the optical transmitter 210, the optical transmission path 230, and the optical receiver 220. The decoding unit 225 performs error correction based on the input symbol sequence or likelihood sequence.

Configuration Example 4

Figure 4:
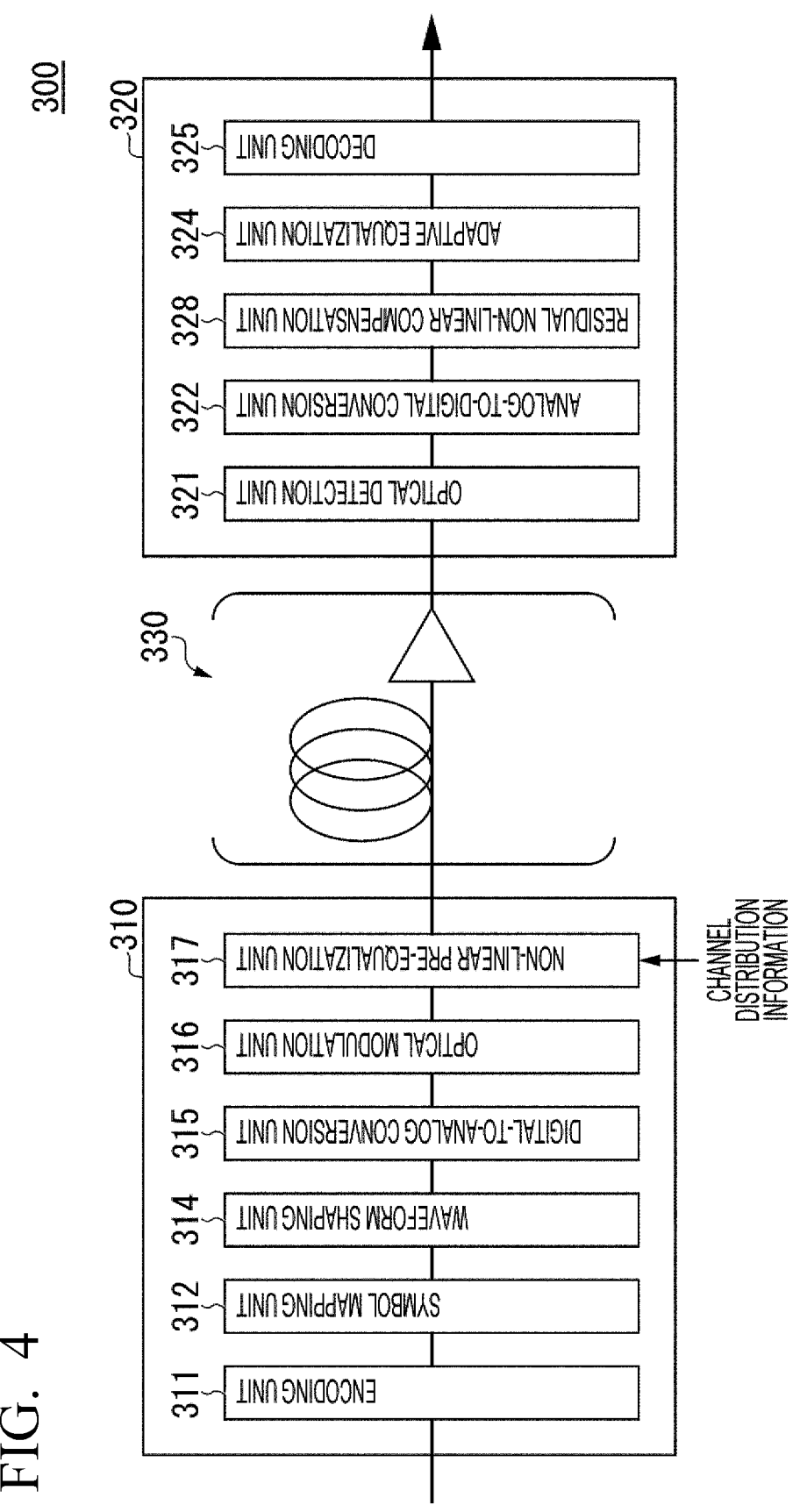
FIG. 4 is a block diagram illustrating a configuration of an optical transmission system 300 in Configuration Example 4.

FIG. 4 is a block diagram illustrating a configuration of an optical transmission system 300 in Configuration Example 4 according to the embodiment. The optical transmission system 300 includes an optical transmitter 310, an optical receiver 320, and an optical transmission path 330. The optical transmitter 310 and the optical receiver 320 are communicatively connected via the optical transmission path 330. The optical transmission path 330 includes an optical fiber, an optical amplifier, or the like, and transmits an optical signal transmitted by the optical transmitter 310 to the optical receiver 320.

The optical transmitter 310 includes an encoding unit 311, a symbol mapping unit 312, a waveform shaping unit 314, a digital-to-analog conversion unit 315, an optical modulation unit 316, and a non-linear pre-equalization unit 317. Configuration Example 4 has a configuration in which the reference signal insertion unit 13 is removed from Configuration Example 1 and the non-linear pre-equalization unit 317 is added.

The encoding unit 311 encodes the input bit sequence using an any error correction code, and outputs the encoded bit sequence to the symbol mapping unit 312. The symbol mapping unit 312 maps the input bit sequence into a predetermined symbol such as QPSK or QAM, and outputs the symbol to the waveform shaping unit 314.

The waveform shaping unit 314 performs Nyquist filtering or the like on the input symbol sequence, and outputs the symbol sequence to the digital-to-analog conversion unit 315. At this time, the waveform shaping unit 314 may pre-equalize inverse characteristics of a transfer function of an analog device or an optical transmission path used in the optical transmitter 110. The digital-to-analog conversion unit 315 converts the input digital signal into an analog signal and outputs the analog signal to the optical modulation unit 316. The optical modulation unit 316 converts the input electrical signal into an optical signal and outputs the optical signal to the non-linear pre-equalization unit 317.

The non-linear pre-equalization unit 317 receives channel distribution information from another device in addition to the output from the optical modulation unit 316. The non-linear pre-equalization unit 317 adds in advance the inverse characteristics of the wavelength dispersion, the polarization mode dispersion, and the optical non-linear effect, which are generated in the transmission path, based on the channel distribution information, to output to the optical transmission path 330. Note that a channel distribution measurement value and a design value (such as a predetermined parameter for adding an inverse characteristic) may be input as the channel distribution information. In this case, the non-linear compensation unit 123 adds an inverse characteristic based on the channel distribution measurement value and the design value, and outputs this to the optical transmission path 30.

The optical receiver 320 includes an optical detection unit 321, an analog-to-digital conversion unit 322, a residual non-linear compensation unit 328, an adaptive equalization unit 324, and a decoding unit 325. Configuration Example 4 has a configuration in which the channel distribution estimation unit 26 and the non-linear compensation unit 23 are removed from Configuration Example 1 and the residual non-linear compensation unit 328 is added.

The optical detection unit 321 converts the signal modulated at the carrier frequency into a baseband analog electrical signal by coherent detection or square-law detection that causes interference between the received optical signal and the local light, and outputs the baseband analog electrical signal to the analog-to-digital conversion unit 322. The analog-to-digital conversion unit 322 converts the analog signal into a digital signal and outputs the digital signal to the residual non-linear compensation unit 328.

By repeatedly executing the processing the linear compensation unit using the FIR filter or frequency domain equalization and the non-linear phase rotation compensation unit according to the intensity of the signal waveform, the residual non-linear compensation unit 328 equalizes the wavelength dispersion, the polarization mode dispersion, and the optical non-linear effect, which cannot be compensated by the non-linear pre-equalization unit 317, to output to the adaptive equalization unit 324. At this time, waveform shaping such as compensation of a transfer function of an analog device of the optical receiver 320 may be performed at the same time in the residual linear compensation unit 328.

The adaptive equalization unit 324 dynamically estimates and compensates for a dynamically varying polarization state, laser frequency offset/phase noise, a clock phase, and the like generated in the optical transmission path by digital signal processing such as an FIR filter and frequency domain equalization, to output to the decoding unit 325. Furthermore, the adaptive equalization unit 324 operates a matching filter corresponding to noise added in the optical transmitter 310, the optical transmission path 330, and the optical receiver 320. The decoding unit 325 performs error correction based on the input symbol sequence or likelihood sequence.

Figure 5:
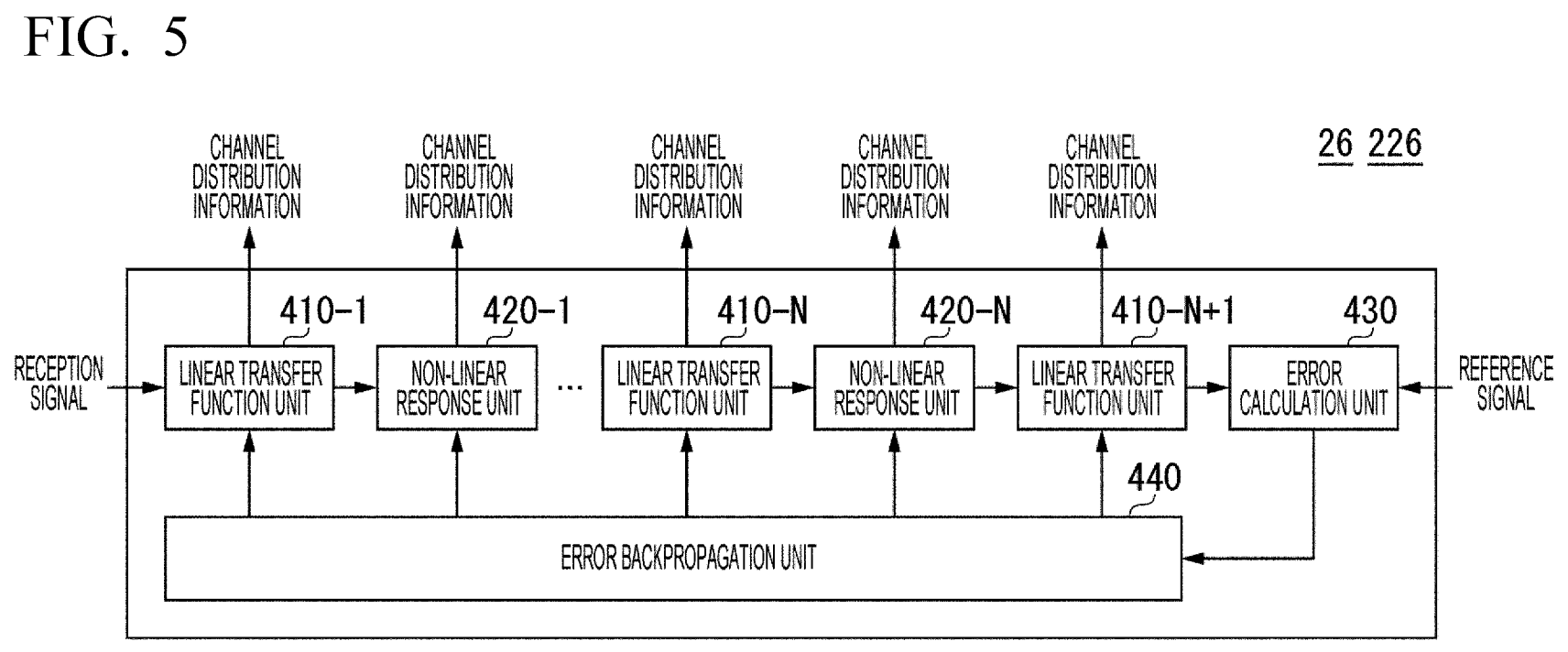

Next, two configuration examples of the channel distribution estimation units 26 and 226 will be described, FIG. 5 is a block diagram illustrating a first configuration example of the channel distribution estimation units 26 and 226. The configuration illustrated in FIG. 5 illustrates a configuration in a case where an estimation method by an error back-propagation method is used.

The channel distribution estimation units 26 and 226 include linear transfer function units 410-1, 410-N, . . . , and 410-N+1, non-linear response units 420-1, . . . , and 420-N, an error calculation unit 430, and an error backpropagation unit 440. In the following description, in a case where the linear transfer function units 410-1, 410-N, . . . , and 410-N+1 are not distinguished from each other, any one of these is expressed as a linear transfer function unit 410. Similarly, in a case where the non-linear response units 420-1, . . . , and 420-N are not distinguished from each other, any one of these is expressed as a non-linear response unit 420. In any of Configuration Examples 1 to 4 illustrated in FIGS. 1 to 4, in a case where a reference signal is transmitted, the reference signal may be transmitted before operation or may be inserted into a signal being operated.

The linear transfer function unit 410 performs the following calculation (1).

[Mathematical formula 1]

$$\begin{pmatrix} E_x^{out}(\omega) \\ E_y^{out}(\omega) \end{pmatrix} = \exp\left(-\frac{j}{2}\beta_2(z)\omega^2\right)\begin{pmatrix} H_{xx}(\omega, z) & H_{yx}(\omega, z) \\ H_{xy}(\omega, z) & H_{yy}(\omega, z) \end{pmatrix}\begin{pmatrix} E_x^{in}(\omega) \\ E_y^{in}(\omega) \end{pmatrix} \tag{1}$$

The non-linear response unit 420 performs the following calculation (2).

[Mathematical formula 2]

$$\begin{pmatrix} e_x^{out}(t) \\ e_y^{out}(t) \end{pmatrix} = \exp\left(jp(z)\gamma\left[|e_x^{in}(t)|^2 + |e_y^{in}(t)|^2\right]\right)\begin{pmatrix} e_x^{in}(t) \\ e_y^{in}(t) \end{pmatrix} \tag{2}$$

The error backpropagation unit 440 performs the following calculation (3).

[Mathematical formula 3]

$$\varepsilon = \sum_t |e_x^{out}(t) - e_x^{ref}(t)|^2 + \sum_t |e_y^{out}(t) - e_y^{ref}(t)|^2 \tag{3}$$

Here, each parameter is as follows.

[Mathematical formula 4]

$$E_x^{out}(\omega), E_y^{out}(\omega) \tag{4}$$

Frequency component of signal corresponding to X or Y polarization

[Mathematical formula 5]

$$e_x^{out}(t), e_y^{out}(t) \tag{5}$$

Time waveform of signal corresponding to X or Y polarization

[Mathematical formula 6]

$$e_x^{ref}(t), e_y^{ref}(t) \tag{6}$$

Figure 6:
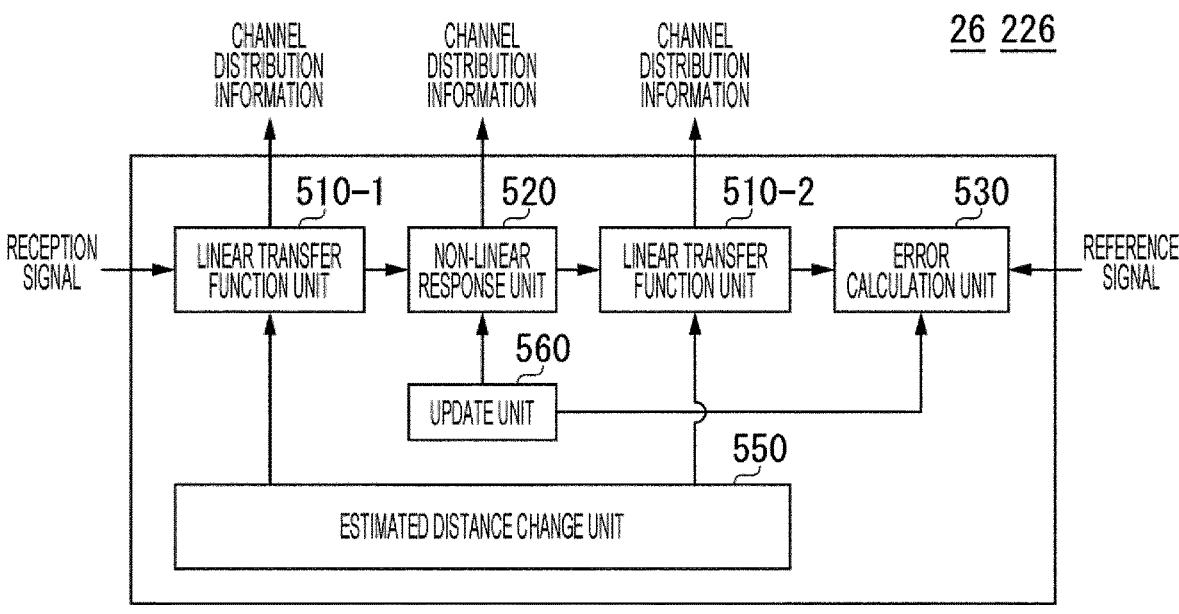
FIG. 6 is a block diagram illustrating a configuration example of the channel distribution estimation units 26 and 226.

Time waveform of reference signal $\beta_z(z)$: wavelength dispersion at distance Z $H_{xx}(\omega, z), H_{yx}(\omega, z), H_{xy}(\omega, z), H_{yy}(\omega, z)$: Jones matrix at distance Z and angular frequency $\omega$ $p(z)$: power at distance Z $\gamma$: non-linear coefficient The linear transfer function unit 410 calculates the above (1) based on the reception signal and the output of the error backpropagation unit 440, and outputs channel distribution information. The non-linear response unit 420 calculates the above (2) based on the reception signal and the output of the error backpropagation unit 440, and outputs channel distribution information. The error calculation unit 430 calculates the above (3) based on the reception signal and the reference signal. The error backpropagation unit 440 updates $\beta_z(z)$, $H_{xx}(\omega, z), H_{yx}(\omega, z), H_{xy}(\omega, z), H_{yy}(\omega, z)$, and $p(z)$ such that $\varepsilon$ output by the error calculation unit 430 decreases, and outputs the updated data to the linear transfer function unit 410 and the non-linear response unit 420. Here, the channel distribution information is, for example, information indicating the wavelength dispersion in the transmission direction, the intensity distribution, the polarization state, and the like estimated from the elements of the wavelength dispersion $\beta_z(z)$, the power $p(z)$, and the Jones matrix, FIG. 6 is a block diagram illustrating a second configuration example of the channel distribution estimation units 26 and 226. The configuration illustrated in FIG. 6 illustrates a configuration in a case where an estimation method by a one-step digital backpropagation method is used. The channel distribution estimation units 26 and 226 include linear transfer function units 510-1 and 510-2, a non-linear response unit 520, an error calculation unit 530, an estimated distance change unit 550, and an update unit 560. In the following description, in a case where the linear transfer function units 510-1 and 510-2 are not distinguished from each other, any one of these is expressed as a linear transfer function unit 510.

The linear transfer function unit 510 performs the calculation of the above (1), the non-linear response unit 520 performs the calculation of the above (2), and the error calculation unit 530 performs the calculation of the above (3). The estimated distance change unit 550 changes $\beta_z(z)$ $(=\beta_{21})$ in the linear transfer function unit 510-1 and $\beta_2(z)$ $(=\beta_{22})$ in the linear transfer function unit 510-2 according to the distance Z to correspond to the distance Z, and outputs the values to the linear transfer function unit 510. At this time, $\beta_{21}+\beta_{22}$=constant. The update unit 560 updates the power p(z) at each transmission distance Z such that $\varepsilon$ output by the error calculation unit 530 decreases, and outputs the power p(z) to the non-linear response unit 520.

Figure 7:
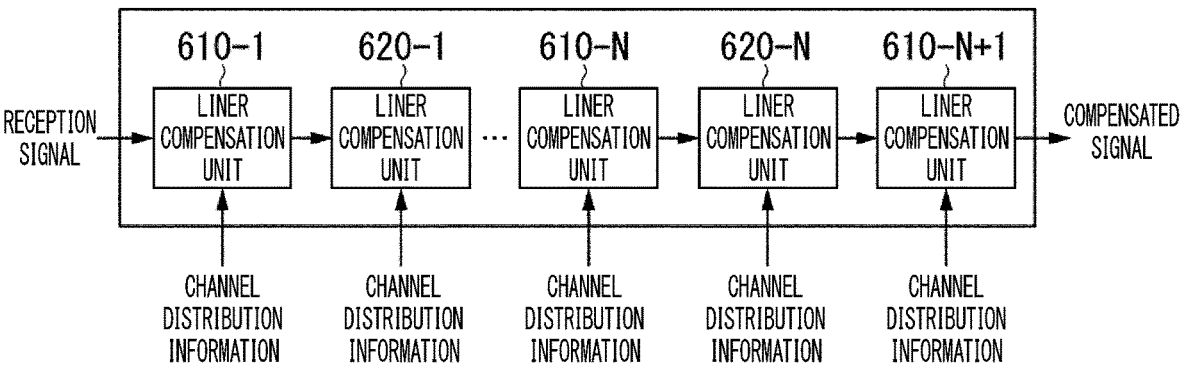

Next, configuration examples of the non-linear compensation units 23 and 123, the non-linear pre-equalization units 217 and 317, and the residual non-linear compensation units 228 and 328 will be described with reference to FIG. 7. The configuration illustrated in FIG. 7 illustrates a configuration in a case where the backpropagation method is used. Note that all of the configurations of the non-linear compensation units 23 and 123, the non-linear pre-equalization units 217 and 317, and the residual non-linear compensation units 228 and 328 are the configurations illustrated in FIG. 7. Therefore, in the description of FIG. 7, the non-linear compensation unit 23 will be described.

The non-linear compensation unit 23 includes linear compensation units 610-1, 610-N, . . . , and 610-N+1, and non-linear compensation units 620-1, . . . , and 620-N. In the following description, when the linear compensation units 610-1, 610-N, . . . , and 610-N+1 are not distinguished from each other, any one of these is expressed as a linear compensation unit 610. Similarly, in a case where the non-linear compensation units 620-1, . . . , and 620-N are not distinguished from each other, any one of these is expressed as a non-linear compensation unit 620.

The channel distribution information is input to both the linear compensation unit 610 and the non-linear compensation unit 620. In addition, a reception signal or an output signal from the preceding non-linear compensation unit 620 is input to the linear compensation unit 610. The non-linear compensation unit 620 receives an output signal from the preceding linear compensation unit 610. The linear compensation unit 610 performs the calculation of above (1), and the non-linear compensation unit 620 performs the calculation of above (2).

As a result, the non-linear compensation units 23 and 123 perform non-linear compensation based on the channel distribution information. The non-linear pre-equalization units 217 and 317 add in advance the inverse characteristics of the wavelength dispersion, the polarization mode dispersion, and the optical non-linear effect, which are generated in the transmission path, based on the channel distribution information. The residual non-linear compensation units 228 and 328 equalize wavelength dispersion, polarization mode dispersion, and an optical non-linear effect that cannot be compensated by the non-linear pre-equalization unit.

Figure 8:
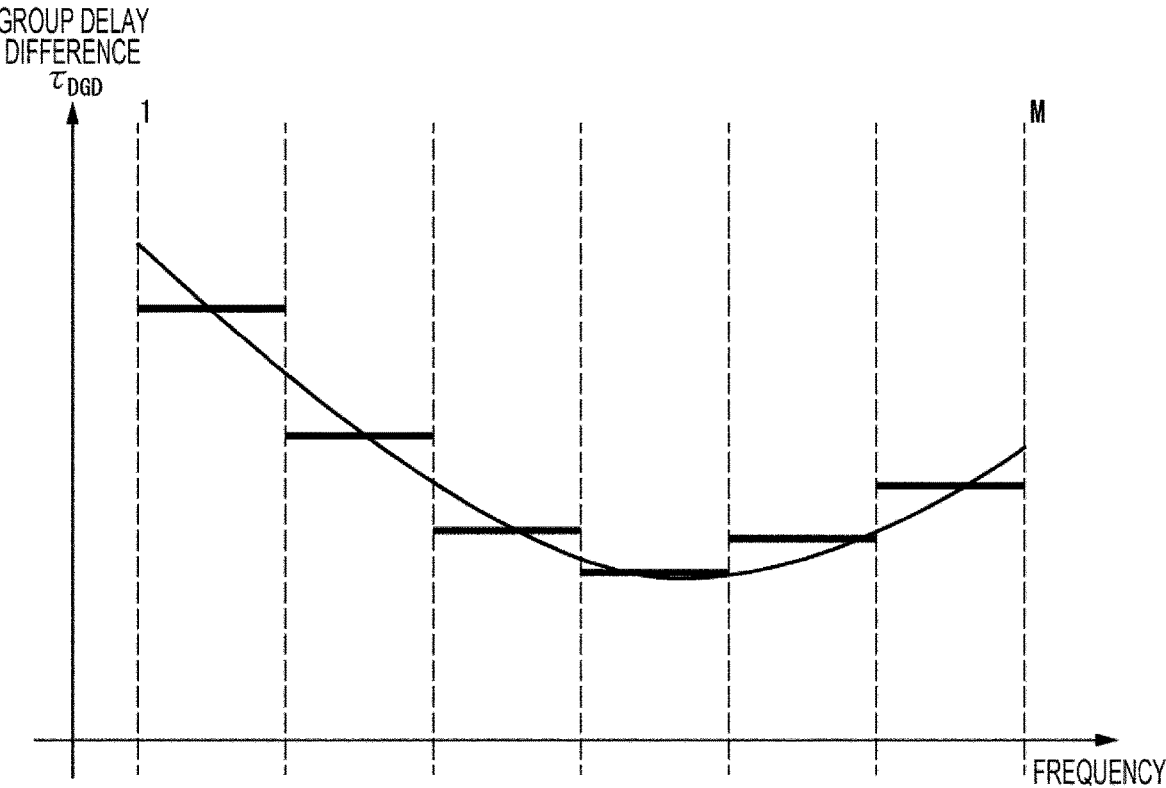
FIG. 8 is a graph illustrating a group delay difference.

Next, a configuration example for reducing the influence of the polarization mode dispersion and improving the estimation and compensation accuracy will be described. FIG. 8 is a graph illustrating a group delay difference. In the graph of FIG. 8, the vertical axis represents a group delay difference $\tau_{DGD}$, and the horizontal axis represents a frequency.

As illustrated in FIG. 8, a band is divided into, for example, M bands, and a group delay difference between polarized waves is regarded as being constant in each band. In FIG. 8, the group delay difference regarded as being constant in the band is indicated by a straight line parallel to the horizontal axis.

Figure 9:
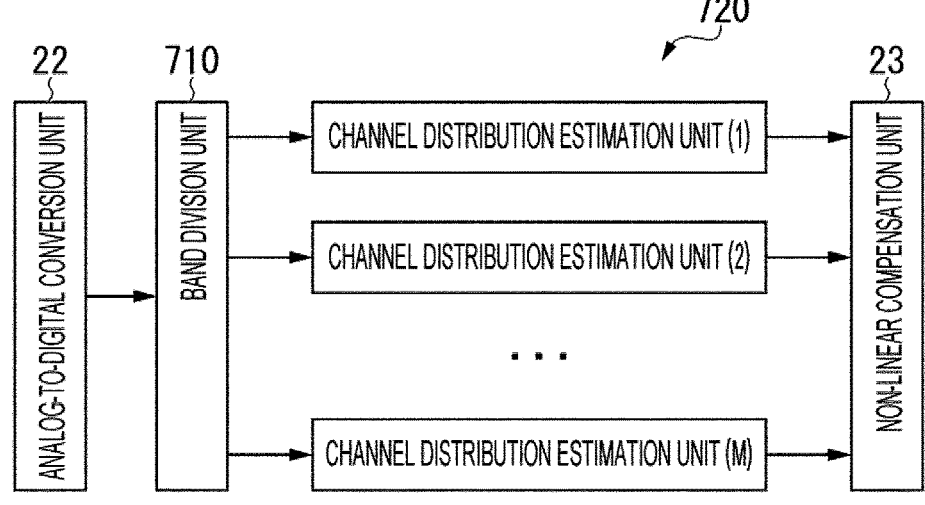
FIG. 9 is a diagram illustrating a configuration example in which a channel distribution estimation unit is provided corresponding to divided bands.
Figure 10:
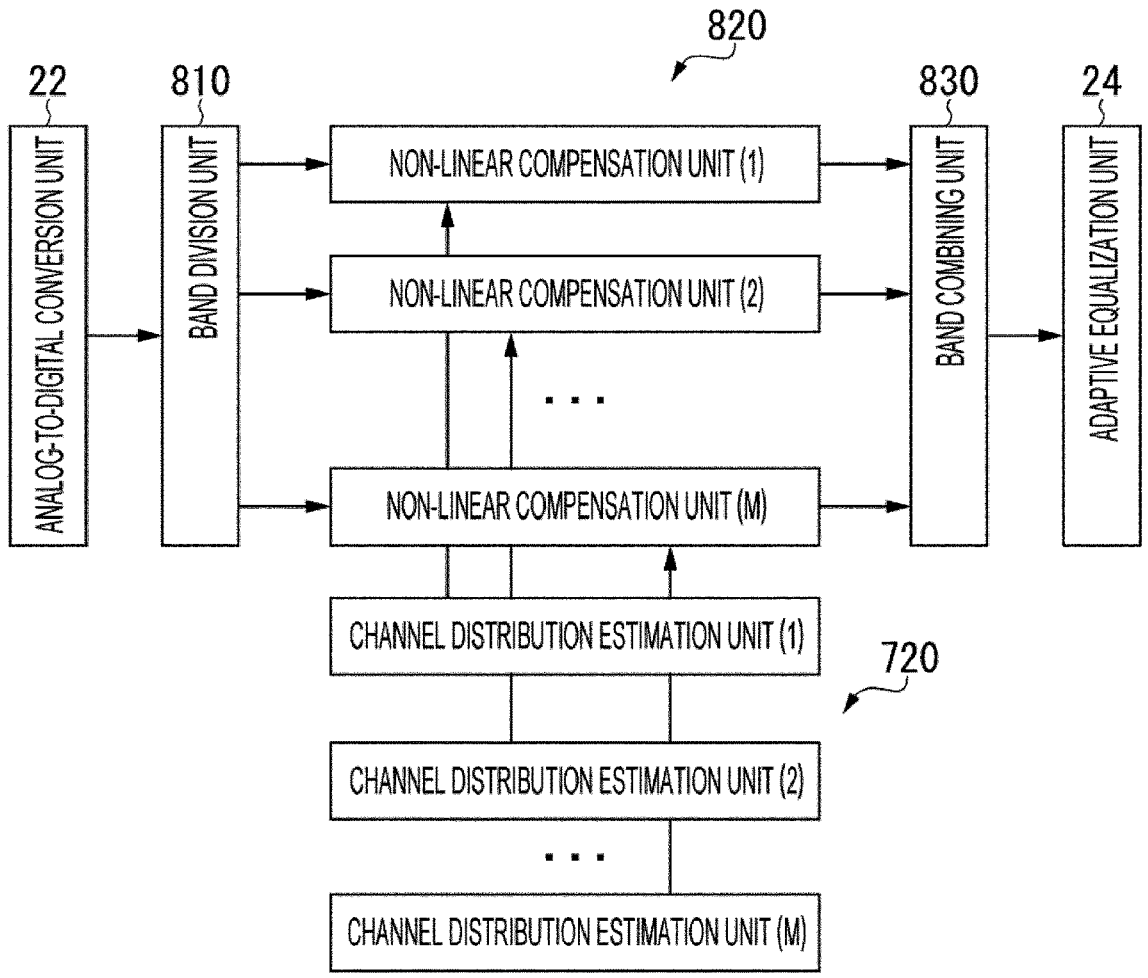
FIG. 10 is a diagram illustrating a configuration example of a non-linear compensation unit in a case where a total of M pieces of channel distribution information are output from a channel distribution estimation unit.

FIG. 9 is a diagram illustrating a configuration example in which the channel distribution estimation unit is provided corresponding to the band divided into M bands. FIG. 10 is a diagram illustrating a configuration example of the non-linear compensation unit in a case where the channel distribution estimation unit is provided corresponding to the band divided into M bands.

In FIG. 9, the signal output from the analog-to-digital conversion unit 22 in FIG. 1 is divided by a band division unit 710 and input into a channel distribution estimation unit 720 provided corresponding to each band. M channel distribution estimation units 720 including the channel distribution estimation units (1) to (M) are provided corresponding to the bands divided into M.

The configurations of the channel distribution estimation units (1) to (M) are the same as the configuration illustrated in FIG. 5, but the linear transfer function unit 410 performs calculation of the following (7) instead of the above-described equation (1).

[Mathematical formula 7]

$$
\begin{pmatrix} E_x^{out}(\omega) \\ E_y^{out}(\omega) \end{pmatrix} = \tag{7}
$$

$$
\exp\left(-\frac{j}{2}\beta_2(z)\omega^2\right) \begin{pmatrix} \exp\left(-\dfrac{j\tau_{DGD}(z)\omega}{2}\right) & 0 \\ 0 & \exp\left(\dfrac{j\tau_{DGD}(z)\omega}{2}\right) \end{pmatrix} \begin{pmatrix} E_x^{in}(\omega) \\ E_y^{in}(\omega) \end{pmatrix}
$$

$\tau_{DGD}$ in (7) represents a group delay difference regarded as being constant in the band.

The channel distribution estimation unit 720 performs calculation and the like according to above (7), and outputs the channel distribution information to the non-linear compensation unit 23 in FIG. 1 or the non-linear pre-equalization unit 217 in FIG. 3. With the configuration illustrated in FIG. 9, in the long-distance transmission in which the group delay difference between the polarized waves is accumulated, the polarization mode dispersion can be expressed by a simple model, and the channel distribution estimation accuracy can be improved.

Note that FIG. 9 illustrates a configuration example applied to the configuration of FIG. 1, but can also be applied to the configuration of FIG. 3. In this case, a preceding stage of the band division unit 710 in FIG. 9 is an analog-to-digital conversion unit 222 instead of the analog-to-digital conversion unit 22, and a subsequent stage of the channel distribution estimation unit 720 is a non-linear pre-equalization unit 217 instead of the non-linear compensation unit 23.

Next, a configuration example of the non-linear compensation unit in a case where a total of M pieces of channel distribution information are output from the channel distribution estimation unit 720 will be described. As illustrated in FIG. 10, the signal output from the analog-to-digital conversion unit 22 in FIG. 1 is divided by the band division unit 810 and input into the non-linear compensation unit 820 provided corresponding to each band, M non-linear compensation units 820 including the non-linear compensation units (1) to (M) are provided corresponding to the bands divided into M.

The non-linear compensation unit (k) (k=1 to M) receives the channel distribution information output from the channel distribution estimation unit (k). The non-linear compensation unit (k) performs non-linear compensation based on the channel distribution information to output to the band combining unit 830. The band combining unit 830 combines the output from the non-linear compensation unit (k) and outputs the combined output to the adaptive equalization unit 24.

Note that FIG. 10 illustrates a configuration example applied to the configuration of FIG. 1, but can also be applied to the configuration of FIG. 3. In this case, a preceding stage of the band division unit 710 in FIG. 10 is the analog-to-digital conversion unit 222 instead of the analog-to-digital conversion unit 22. The M non-linear compensation units are M non-linear pre-equalization units (k) corresponding to bands obtained by dividing the non-linear pre-equalization unit 217 into M units.

The non-linear pre-equalization unit (k) receives the channel distribution information output from the channel distribution estimation unit (k). The non-linear pre-equalization unit (k) adds in advance the inverse characteristics of the wavelength dispersion, the polarization mode dispersion, and the optical non-linear effect, which are generated in the transmission path, based on the channel distribution information, to output to the band combining unit 830. The band combining unit 830 combines the output from the non-linear pre-equalization unit (k) and outputs the combined output to the optical transmission path 230 instead of the adaptive equalization unit 24.

Figure 11:
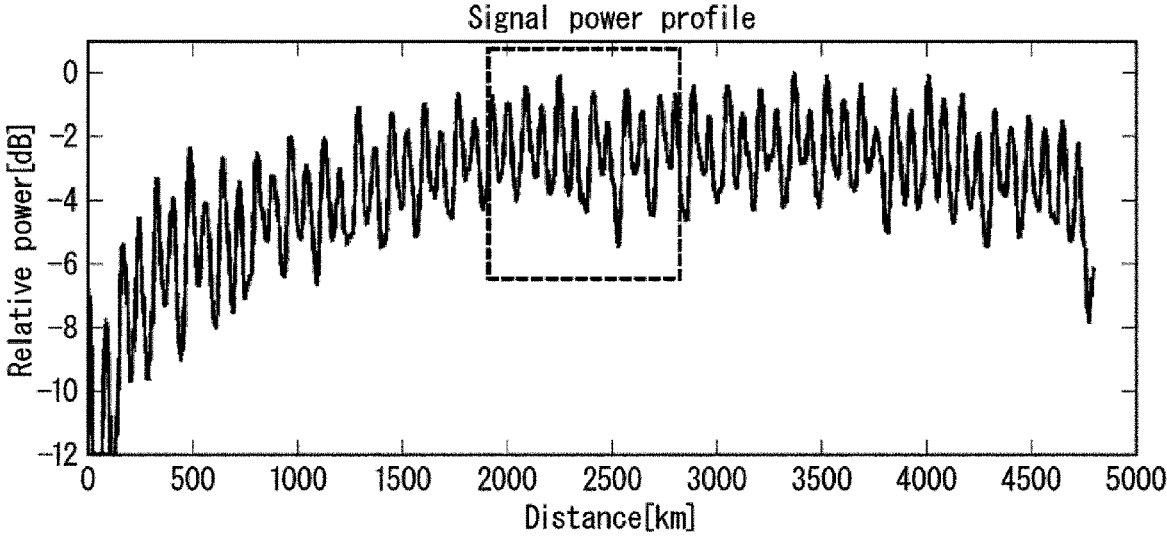
FIG. 11 is a graph illustrating a channel distribution (intensity distribution) estimation result.
Figure 12:
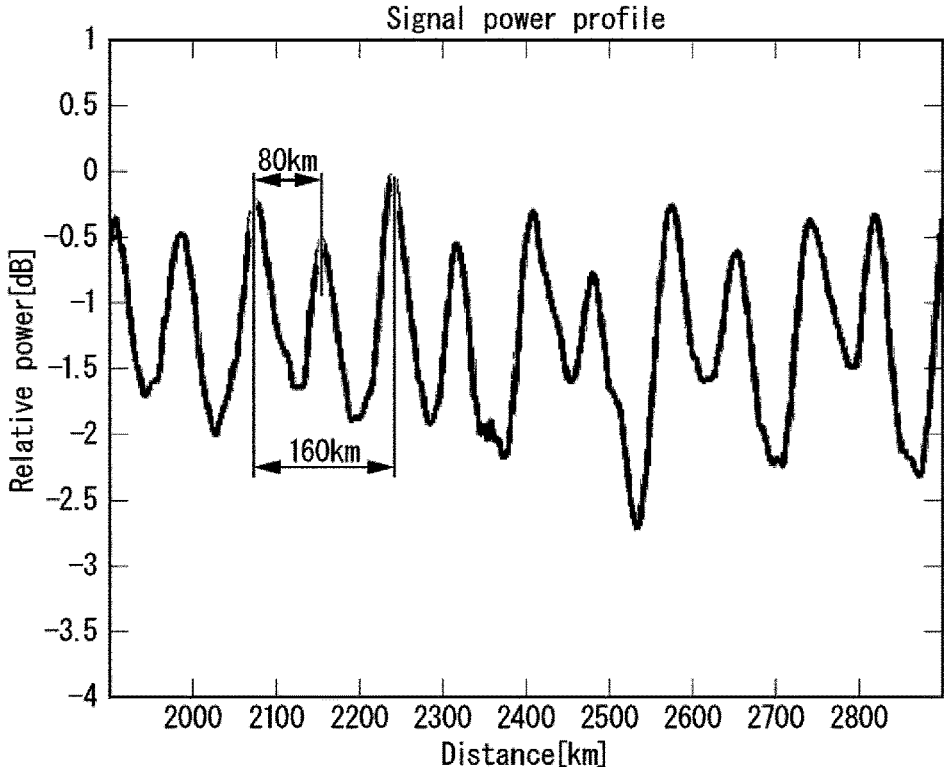
FIG. 12 is an enlarged graph of a region surrounded by a broken line.

FIG. 11 is a graph illustrating a channel distribution (intensity distribution) estimation result (measurement wavelength: 1545.32 nm, Pin: 5 dBm/channel) in the configuration of FIG. 1 to which the configuration of FIG. 6 is applied. The horizontal axis represents the distance Z (km), and the vertical axis represents p(z) (dB). FIG. 12 is an enlarged graph of a region surrounded by a broken line in the graph illustrated in FIG. 11. As shown in FIG. 12, in the enlarged region, it is shown that a peak arrives at a distance of a little less than 2100 km, a peak arrives again at a distance increased by approximately 80 km from the peak, and a peak arrives again at a distance increased by 160 km from the distance of a little less than 2100 km.

Figure 13:
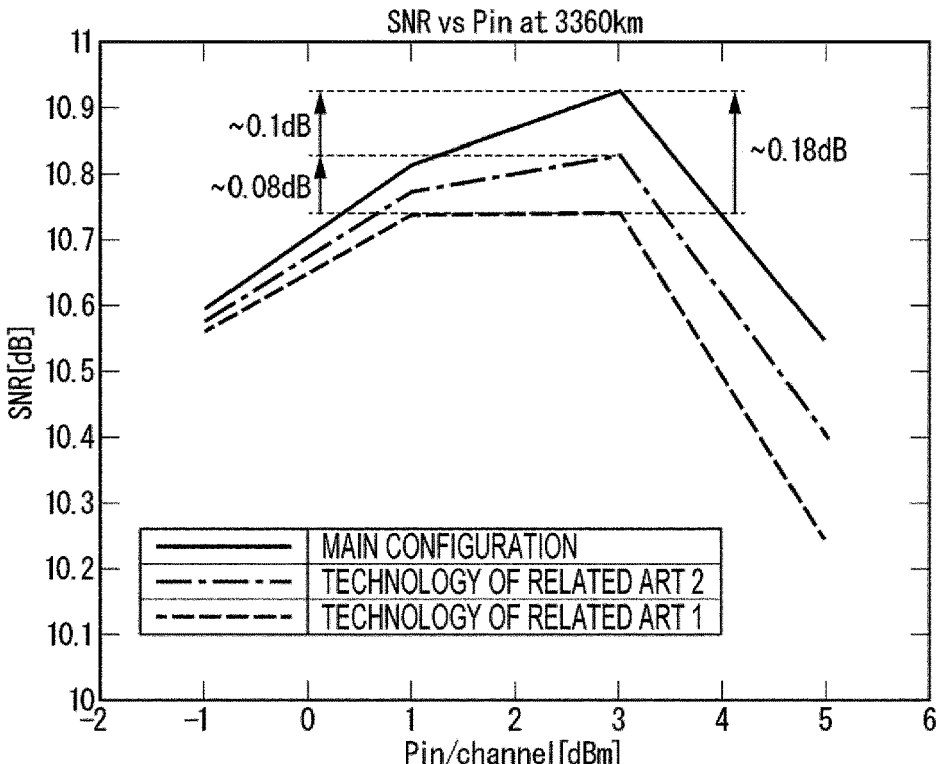
FIG. 13 is a graph illustrating Pin and SNR.

Next, the dependency of the fiber input power of the consistency (SNR) between the symbol output from the adaptive equalization unit 24 and the transmission symbol in the configuration of FIG. 1 to which the configuration of FIG. 6 is applied will be described. FIG. 13 is a graph illustrating Pin (dBm) per channel and SNR (dB) at that time. In the graph illustrated in FIG. 13, the horizontal axis represents Pin (dBm) per channel, and the vertical axis represents SNR (dB). In addition, a graph indicated by a broken line indicates an SNR in a case where only wavelength dispersion compensation is performed (also referred to as "related art 1"). A graph indicated by a dotted broken line indicates an SNR in a case where compensation by digital backpropagation with a constant intensity distribution is performed (also referred to as "related art 2"). The graph indicated by the solid line indicates the SNR in the configuration (also referred to as "the present configuration") illustrated in FIGS. 1 and 6.

As illustrated in FIG. 13, in any PIN, the SNR is larger in the present configuration than in the related art 1 and 2. For example, when Pin is 3 (dBm), it is indicated that the SNR of the present configuration is larger by approximately 0.18 (dB) than that of related art 1 and larger by 0.1 (dB) than that of related art 2. As described above, since sufficient compensation can be performed as compared with the related art 1 and 2, high-performance optical communication can be realized.

The channel distribution estimation units 26, 226, and 720 include a processor such as a central processing unit (CPU) and a memory. In this case, the channel distribution estimation units 26, 226, and 720 function as the channel distribution estimation units 26, 226, and 720 when the processor executes a program. All or some of the functions of the channel distribution estimation units 26, 226, and 720 may be realized by using hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, or a semiconductor storage device (e.g., a solid state drive (SSD)), and a storage device such as a hard disk or a semiconductor storage device built in a computer system. The program may be transmitted via an electric communication line.

Although the embodiments of the present invention have been described in detail with reference to the drawings, the specific configuration is not limited to the embodiments, and includes design and the like without departing from the spirit of the present invention.

INDUSTRIAL APPLICABILITY

The present invention is applicable to an optical transmission system that performs transmission through an optical fiber transmission path.

REFERENCE SIGNS LIST

1 Optical transmission system
10 Optical transmitter
11 Encoding unit
12 Symbol mapping unit
13 Reference signal insertion unit
14 Waveform shaping unit
15 Digital-to-analog conversion unit
16 Optical modulation unit
20 Optical receiver
21 Optical detection unit
22 Analog-to-digital conversion unit
23 Non-linear compensation unit
24 Adaptive equalization unit
25 Decoding unit
26 Channel distribution estimation unit
27 Reference signal
30 Optical transmission path
100 Optical transmission system
110 Optical transmitter
111 Encoding unit
112 Symbol mapping unit
114 Waveform shaping unit
115 Digital-to-analog conversion unit
116 Optical modulation unit
120 Optical receiver
121 Optical detection unit
122 Analog-to-digital conversion unit
123 Non-linear compensation unit
124 Adaptive equalization unit 125 Decoding unit
130 Optical transmission path
200 Optical transmission system
210 Optical transmitter
211 Encoding unit
212 Symbol mapping unit
214 Waveform shaping unit
215 Digital-to-analog conversion unit
216 Optical modulation unit
217 Non-linear pre-equalization unit
220 Optical receiver
221 Optical detection unit
222 Analog-to-digital conversion unit
224 Adaptive equalization unit
225 Decoding unit
226 Channel distribution estimation unit
228 Residual non-linear compensation unit
230 Optical transmission path
300 Optical transmission system
310 Optical transmitter
311 Encoding unit
312 Symbol mapping unit
314 Waveform shaping unit
315 Digital-to-analog conversion unit
316 Optical modulation unit
317 Non-linear pre-equalization unit
320 Optical receiver
321 Optical detection unit
322 Analog-to-digital conversion unit
324 Adaptive equalization unit
325 Decoding unit
328 Residual non-linear compensation unit
330 Optical transmission path
410, 410-1, 410-N Linear transfer function unit
420, 420-1 Non-linear response unit
430 Error calculation unit
440 Error backpropagation unit
510, 510-1, 510-2 Linear transfer function unit
520 Non-linear response unit
530 Error calculation unit
550 Estimated distance change unit
560 Update unit
610, 610-1, 610-N Linear compensation unit
620, 620-1 Non-linear compensation unit
710 Band division unit
720 Channel distribution estimation unit
810 Band division unit
820 Non-linear compensation unit
830 Band combining unit

The invention claimed is:

1. An optical receiver in an optical transmission system that transmits an optical signal between an optical transmitter and an optical receiver connected via an optical fiber transmission path, the optical receiver comprising:

a channel distribution estimator that estimates channel distribution information in a transmission direction in the optical fiber transmission path based on the optical signal transmitted from the optical transmitter and a reference signal; and a non-linear compensator that performs non-linear compensation based on the channel distribution information estimated by the channel distribution estimator, wherein the channel distribution estimator includes a plurality of linear transfer function units, one or more non-linear response units, and an error calculation unit, each of the plurality of linear transfer function units calculates frequency component of the optical signal based on the optical signal, wavelength dispersion at a distance, and Jones matrix at the distance and an angular frequency, and estimates the channel distribution information based on the wavelength dispersion at the distance and elements of the Jones matrix, each of the one or more non-linear response units calculate a time waveform of the optical signal, based on the optical signal and a power at the distance, and estimates the channel distribution information based on the power at the distance, the error calculation unit calculates an error based on the calculated time waveform of the optical signal and a lime waveform of the reference signal, and the power at the distance is updated such that the error calculated by the error calculation unit decreases.

2. An optical receiver comprising a non-linear compensator that performs non-linear compensation based on channel distribution information in a transmission direction estimated based on an optical signal transmitted from an optical transmitter connected via an optical fiber transmission path and a reference signal, wherein the non-linear compensator includes a plurality of linear compensation units and a plurality of non-linear phase rotation compensation units, each of the plurality of linear compensation units performs a compensation processing using an a filter or a frequency domain equalization, based on the optical signal or the optical signal output from a preceding non-linear phase rotation compensation unit, and the channel distribution information, and each of the plurality of non-linear phase rotation compensation units performs a non-linear phase rotation compensation processing according to an intensity of a signal waveform, based on the optical signal output from a preceding linear compensation unit and the channel distribution information.

3. The optical receiver according to claim 1, wherein the channel distribution information is an intensity distribution, a polarization state, and the wavelength dispersion in the transmission direction in the optical fiber transmission path.

4. The optical receiver according to claim 2, wherein the channel distribution information is an intensity distribution, a polarization state, and a wavelength dispersion in the transmission direction in the optical fiber transmission path.

5. The optical receiver according to claim 1, wherein the channel distribution estimator includes an error backpropagation unit that updates the wavelength dispersion at the distance, and the elements of the Jones matrix at the distance and the angular frequency, in addition to the power at the distance, such that the error calculated by the error calculation unit decreases.

6. The optical receiver according to claim 1, wherein the channel distribution estimator includes an estimated distance change unit changes first wavelength dispersion at the distance of a first linear transfer function unit and second wavelength dispersion at the distance of a second linear transfer function unit according to the distance, such that a sum of the first wavelength dispersion and the second wavelength dispersion remains constant, and outputs the first wavelength dispersion and the second wavelength dispersion to the plurality of linear transfer function units.

7. An optical transmission system that transmits an optical signal between an optical transmitter and an optical receiver connected via an optical fiber transmission path, wherein the optical receiver includes a channel distribution estimator that estimates channel distribution information in a transmission direction in the optical fiber transmission path for performing non-linear compensation based on the optical signal transmitted from the optical transmitter and a reference signal, wherein the channel distribution estimator includes a plurality of linear transfer function units, one or more non-linear response units, and an error calculation unit, each of the plurality of linear transfer function unity calculated frequency component of the optical signal based on the optical signal, wavelength dispersion at a distance, and Jones matrix at the distance and an angular frequency, and estimates the channel distribution information based on the wavelength dispersion at the distance and elements of the Jones matrix, each of the one or more non-linear response units calculate a time waveform of the optical signal, based on the optical signal and a power at the distance, and estimates the channel distribution information based on the power at the distance, the error calculation unit calculates an error based on the calculated time waveform of the optical signal and a time waveform of the reference signal, and the power at the distance is updated such that the error calculated by the error calculation unit decreases, and the optical transmitter includes a non-linear pre-equalizer that adds in advance inverse characteristics of wavelength dispersion, polarization mode dispersion, and an optical non-linear effect, which are generated in the optical fiber transmission path, to an optical signal transmitted to the optical receiver based on the channel distribution information estimated by the channel distribution estimator.

8. The optical transmission system according to claim 7, wherein the channel distribution information includes an intensity distribution, a polarization state, and the the wavelength dispersion in the transmission direction in the optical fiber transmission path.

* * * * *